(12) United States Patent
Fischer

(10) Patent No.: US 6,253,461 B1
(45) Date of Patent: *Jul. 3, 2001

(54) CASTING ROD AND REEL WITH DISTANCE METER

(76) Inventor: David C. Fischer, 11 Upland Dr., Chappaqua, NY (US) 10514

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/743,854

(22) Filed: Nov. 5, 1996

(51) Int. Cl.$^7$ .............................. A01K 89/00; B65H 61/00
(52) U.S. Cl. .............................. 33/762; 33/706; 33/732; 242/223
(58) Field of Search .............................. 33/706, 719, 732, 33/733, 755, 756, 762, 763; 242/223

(56) References Cited

U.S. PATENT DOCUMENTS

| | | | |
|---|---|---|---|
| 3,436,954 | * | 4/1969 | Eppler ..................................... 33/732 |
| 4,031,360 | * | 6/1977 | Soule, Jr. ............................... 33/763 |
| 4,402,470 | * | 9/1983 | Hamayasu ............................. 242/223 |
| 4,765,063 | * | 8/1988 | Sing ....................................... 33/707 |
| 5,027,526 | * | 7/1991 | Crane ..................................... 33/763 |
| 5,286,972 | * | 2/1994 | Falk et al. .............................. 33/763 |
| 5,345,691 | * | 9/1994 | Falk et al. .............................. 33/763 |
| 5,406,715 | * | 4/1995 | Koizumi et al. ....................... 33/763 |
| 5,524,831 | * | 6/1996 | Carlson ................................. 33/707 |

FOREIGN PATENT DOCUMENTS 57-15847 * 4/1985 (JP) ..................................... 242/223

* cited by examiner

*Primary Examiner*—Andrew H. Hirshfeld
(74) *Attorney, Agent, or Firm*—Marvin N. Gordon

(57) ABSTRACT

A fishing rod and reel is provided with a line having conductive portions spaced at regular axial intervals. A conductive sensor is mounted to the rod along the line's path. A counter is connected to the conductive sensors to count the number of conductive portions that pass by the sensors and complete a circuit therewith. Based on the number of counts and the length of the interval between the conductive portions, the overall length of line that is unwound from the real, that is, passes by the sensors, is calculated and displayed.

7 Claims, 3 Drawing Sheets

CASTING ROD AND REEL WITH DISTANCE METER

FIELD OF THE INVENTION

The invention relates generally to devices for measuring distances and depths, and more specifically to a device for use with a fishing or casting rod and reel to measure the amount of line reeled out such as during a cast.

BACKGROUND OF THE INVENTION

Fisherman have, from time immemorial, cast their lines in the hope of catching a fish at the end of the line. Fishermen practice their casting techniques in the hope of having their line extend further into the waters where the fish are. Many fishermen wish to know how far their lines have been cast. It is not, however, practical for the fisherman to cast his line and then proceed to measure its length of cast by the use of conventional measuring devices such as a tape measure.

There have been several attempts to provide a fisherman with a measuring device that is capable of measuring the distance that a wire or string is released or unwound from a holder such as a spool or reel without requiring the user to be at both ends of the line, as is necessary with a long tape measure.

For example, U.S. Pat. No. 5,286,972 to Falk et al. discloses a device having a string wound on a spool. To measure the distance the string is unwound from the spool, it is covered with dye at regular intervals along its length. Photoelectric sensors detect the passage of the dyed areas as the string is spooled out. Since the dyed areas are spaced from one another by a known distance, counting the number of dyed areas that pass the sensors allows calculation of the amount of string that has been spooled out, and thus, the distance spanned by the string. However, none of the devices disclosed in the art provide effective means for measuring the amount of fishing line that is cast with a rod and reel. The photoelectric scheme of the Falk patent, for example, would be inappropriate for this use with a rod and reel. Debris from the water, such as plant matter or dirt, that sticks to the line might trigger the optical sensors of the Falk device, generating a false signal and creating an incorrect distance measurement. The sensors themselves could also become covered with muck, defeating their usefulness altogether. Stray light from the sun or reflections in rugged outdoor conditions could also cause erroneous measurements as the rod is rapidly moved through an entire arc of motion. Further, with a line speed exceeding several feet per second, the likelihood of erroneous results due to optical irregularities is greatly increased.

The prior system as exemplified in the Falk patent also suffers from high battery drain, since the light emitters must be on during the entire casting operation. Finally, the path that the line is forced to take between the optical emitters and detectors is quite narrow, which may well result in limited vertical and lateral motion and increased friction on the line.

SUMMARY OF THE INVENTION

In view of the deficiencies of the prior art, it is an object of the invention to provide a measuring device for use with a casting rod and reel that is capable of accurately measuring the amount of line cast.

It is another object of the invention to provide a measuring device of the type described that is capable of measuring the depth of a body of water.

It is another object of the invention to provide an improved line and sensor kit for retrofitting a rod and reel for measuring the length of line cast.

It is a further object of the invention to provide a casting distance measuring device for use with a rod and reel that is resistant to errors in various operating conditions and various casting speeds, and that is simple and cost-effective to manufacture.

In accordance with the objects of the invention, the fishing line used with an otherwise conventional rod has conductive portions affixed to the line at regularly spaced intervals. Conductive sensors such as brushes are fixedly mounted to the rod along the line's path. As the line is cast from the reel, the conductive portions pass through the fixed conductive sensors and each time that occurs an electrical circuit is completed. A counter connected to the conductive sensors counts the number of times a conductive portion passes the conductive sensor and completes a circuit. Based on the number of counts and the length of the interval between the conductive portions, the overall length of line that passes by the conductive sensors is calculated and displayed.

BRIEF DESCRIPTION OF THE DRAWINGS

The foregoing and other objects and advantages will become apparent to those skilled in the art upon reading the following detailed description of a preferred embodiment in conjunction with a review of the appended drawings, in which.

DETAILED DESCRIPTION OF THE PREFERRED EMBODIMENTS

Figure 1:
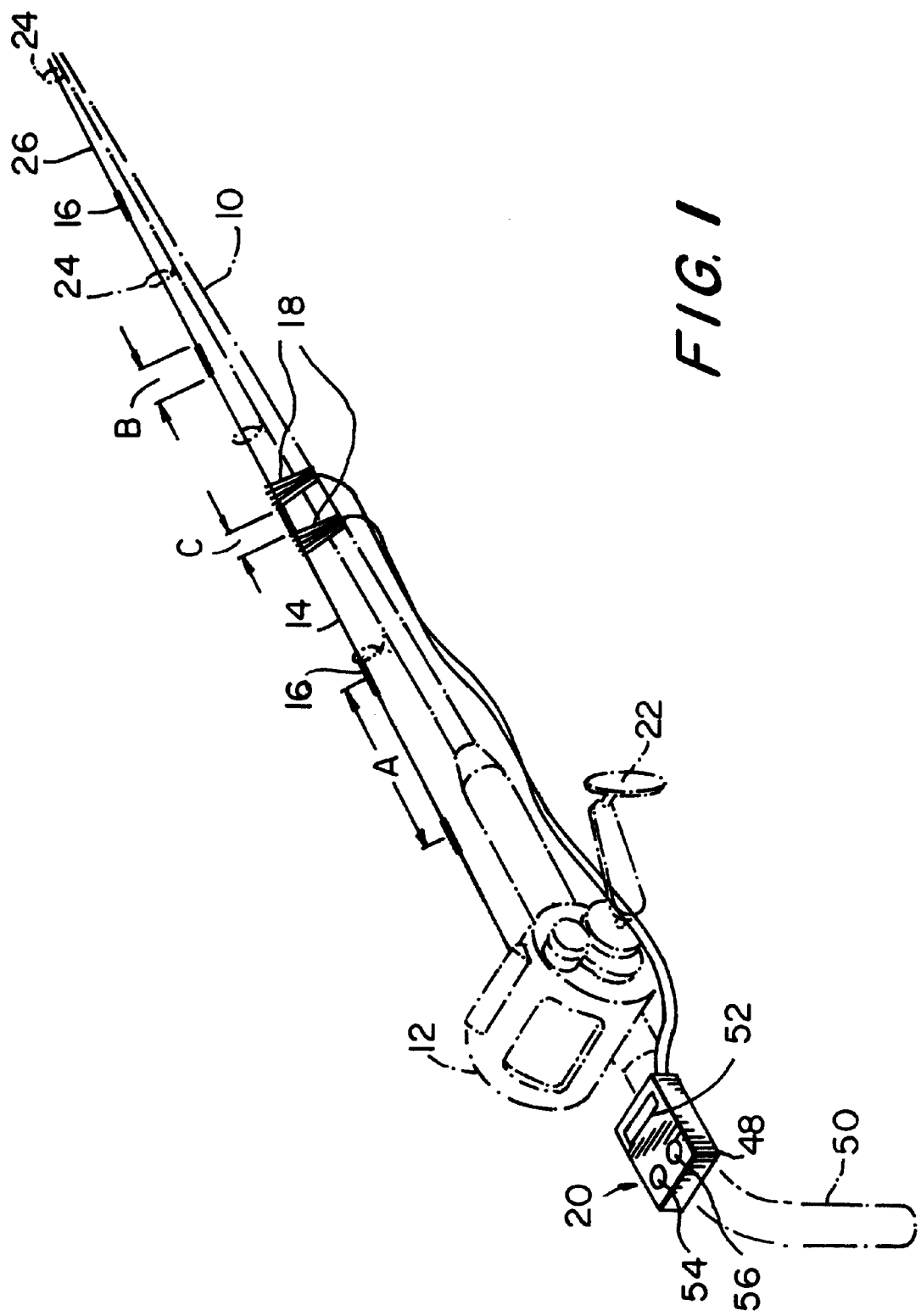
FIG. 1 is a perspective view of a rod and reel according to the present invention.
Figure 2:
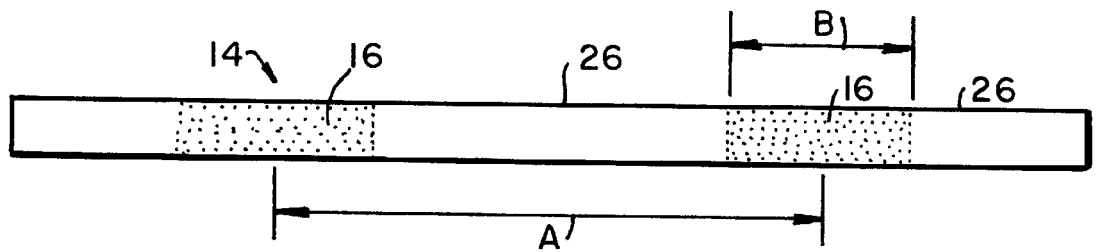
FIG. 2 is a detailed view of a section of casting line according to the present invention.

Referring now to FIG. 1, a rod 10 and reel 12 are shown having the distance-measuring apparatus of the present invention. The apparatus preferably includes a modified casting line 14 having a plurality of longitudinally spaced electrically conductive portions 16 secured to the line. A pair of conductive sensors 18 mounted to the rod 10 for detecting the passage of the conductive portions 16 past the sensors as the line is cast out. Calculating circuitry 20 is connected to the sensors 18 for counting the number of times a conductive portion 16 passes by the sensors 18 and then displays the resulting distance to the fisherman.

The rod 10 and reel 12 used with the present invention may generally be of any standard design, such as those commonly used in surf casting and salt water and lake fishing. Typically, the reel 12 includes a crank lever 22 for reeling in the line and a release mechanism for allowing the line 14 to be cast unfettered by the reel's drag. For many designs, this means the reel 12 is mounted axis-parallel to the rod 10 with the line 14 uncoiling off one end, although this is not necessary for the present invention. The rod 10 typically includes several ring guides 24 that keep the line 14 strung generally parallel to the rod 10. As will be discussed below, one embodiment of the present invention is a retrofit kit for modifying existing rods and reels; any standard rod and reel may be used with the present invention.

In the preferred embodiment of the invention described herein, a modified casting line 14 is wound around the reel 12 and threaded through the ring guides 24. The base casting line 26 may be of any known type as long as the material is not electrically conductive. The line is modified to include a plurality of electrically conductive portions 16 spaced longitudinally at one line. The conductive portions 16 may be formed in any of various ways. Preferably, the conductive portions 16 may be in the form of a conductive finish that is commercially available in liquid form and applied to the line 14 as by painting the line at the desired locations. Alternatively, a thin metal layer may be wrapped around the line 14 at appropriately spaced locations to form the conductive portions 16. The conductive portions 16 may be alternatively formed of solid material that is formed integral with the line 14, such as by adhesives. In any case, the conductive material used to form the conductive portions 16 preferably has a similar density to the casting line 14 such that the casting properties of the line 14 are not significantly affected. The base line 26 is preferably thinned at the location of the conductive portions 16 so that the outer surface of the metal layer 28 is flush with the remainder of the line 14.

Figure 3:
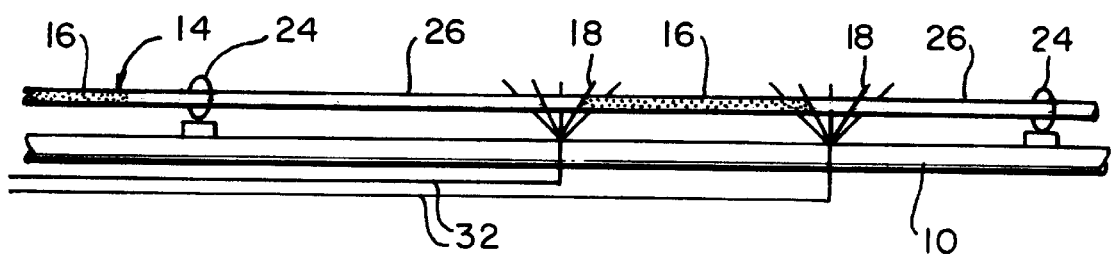
FIG. 3 is a detailed view of sensors and casting line mounted on the rod of FIG. 1.

A pair of electrically conductive sensors 18 are mounted on the rod 10 in the path of movement of the line 14. The sensors 18 preferably include brushes with bristles attached at one end to the rod 10. Each sensor 18 is connected to a wire 32 which is electrically coupled to the calculating circuitry 20 and display 48, described in greater detail below. When no conductive portion 16 spans the sensors 18, the two sensors 18 constitute an open circuit. When one conductive portion 16 passes between the sensors 18 it closes the electrical circuit between them. To ensure that a closed circuit is formed between the conductive portions 16 and sensors 18, the axial length B of each of the conductive portions 16 along the line 14 is selected such that a single conductive portion 16 is capable of touching both sensors 18 simultaneously, as seen in FIG. 3. In other words, the spacing c between the sensors 18 is less than the axial length B of each conductive portion 16.

The number, length and rigidity of the conductive bristles of the sensors 18 are each preferably selected so that the line 14 is able to move relatively freely through the bristles while maintaining a secure electrical contact between the conductive portions 16 and sensors 18. The brushes included in sensors 18 may advantageously be conductive bristles attached to a metal ring, similar to the line guide that is normally found on a fishing rod. The bristles preferably extend inward toward the center of the ring, thereby to assure that the line passes through the bristles.

The use of brushes as the electrical sensor allows the line to move in various directions as it is cast while maintaining electrical contact with the brushes. Although there may be some slight friction between the line 14 and brushes, the flush surface between the conductive portions 16 and the base line 26, combined with perhaps a slightly heavier end weight for the line, if needed, will eliminate any adverse effects on casting distance that may be caused by the sensor brushes 18. Conductive sensors other than brushes may be suitable for use in the present invention so long as they do not significantly impede the movement of the line 14 and thereby decrease the distance of cast made by the fisherman.

The distance-measuring apparatus of the present invention will operate accurately in practically all fishing and casting environments. That is, small amounts of water or debris will not interfere with the electrical connection made between the conductive portions 16 and sensors 18, since even if one bristle is kept from contact with the conductive portion by debris, other sensor bristles will remain in contact with the conductive portion. Further, any water that may cling to the surface of the line due to surface tension as the line is removed from the water is scraped or squeezed off during reeling in, or is propelled from the line during the forceful casting operation. If necessary, a non-conducting brush (not shown) may be attached to the rod to catch the water on the line as the line is being reeled in. In any case, water on the line would have to be of a sufficient amount to span between two sensors 18 and close the circuit between them to cause erroneous result. The distance between the sensors 18, however, is therefore selected to substantially prevent this occurrence.

Figure 4:
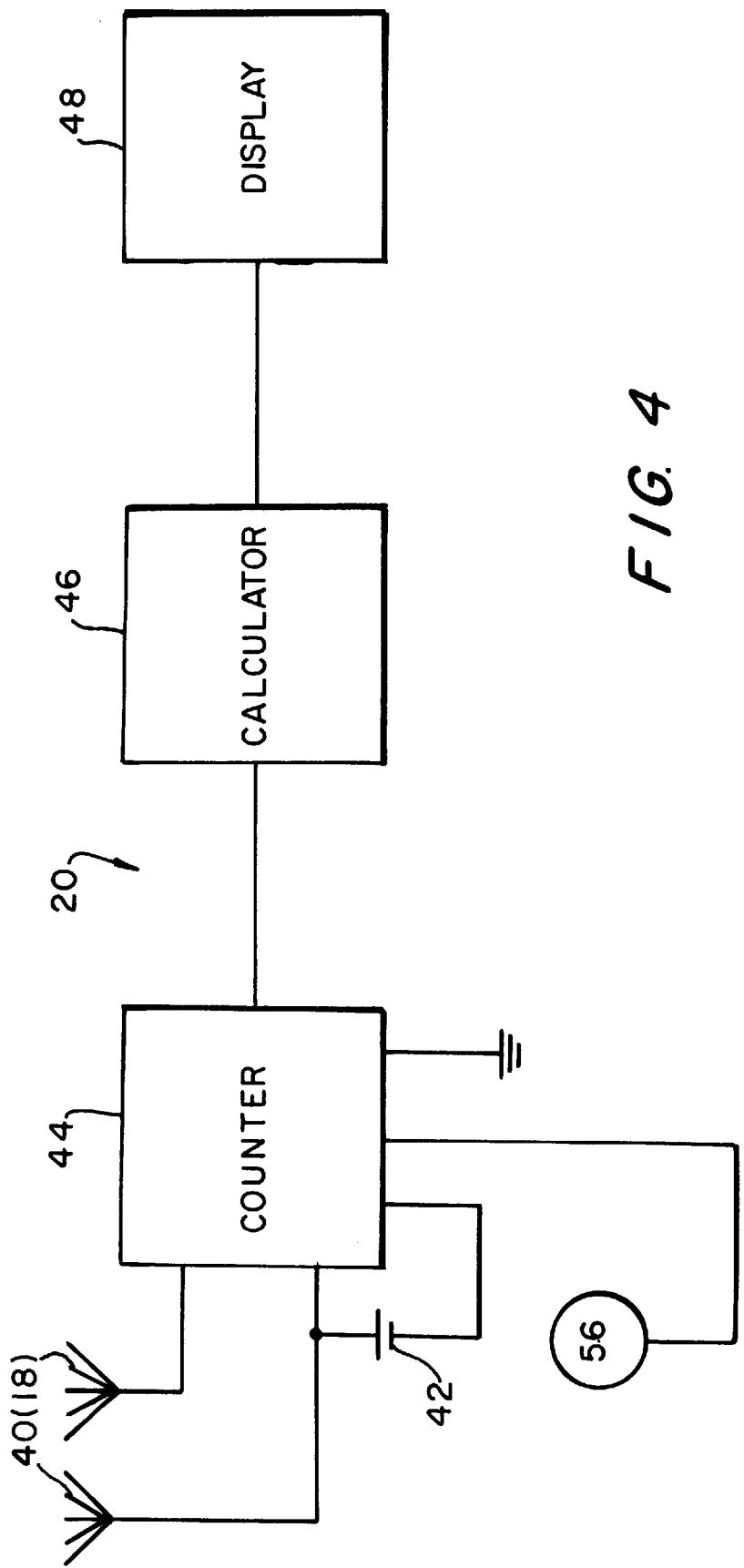
FIG. 4 is a functional circuit schematic of the rod and reel of FIG. 1.

Referring now to FIG. 4, a basic circuit schematic for the present invention is shown. The two open terminals 40 of the circuit are the two conductive sensors 18 mounted to the rod. A battery 42 or other voltage source is connected to the circuit such that when a conductive portion 16 of the line closes the circuit between the two terminals 40, a voltage is applied to a counter 44, which counts the number of times the circuit is alternately closed and then opened. The counter 44 also preferably includes a delay circuit with a recovery time selected to prevent an extremely rapid open/close of the circuit, such as when one conductive portion causes multiple open/closes, from being counted. If desired, a resistor (not shown) may be added to the FIG. 4 circuit to reduce the level of the already weak current signals that may be generated by the water on the line while still allowing the stronger current signals generated by the conductive coating to register on the counter 44.

The output of the counter 44 is applied to a calculator 46, which converts the number of counts to a distance indication based on the preprogrammed distance between the conductive portions 16 on the line. It is contemplated that the distance multiplier could be selectable on the calculator, if lines with different distances between the conductive portions were available. Once calculated, the distance of the cast is displayed on the digital display 48 in the housing near the handle 50 of the rod 10. Preferably, the distance is not displayed until the cast is completed, i.e., the counter does not provide a count/distance signal to the calculator and thus to the display for a predetermined time period. Alternatively, the distance may be displayed continuously, although the operator will be unable to see much of the increasing display due to the casting motion.

The calculating circuitry 20 is preferably stored in a small housing 52 attached to the rod 10 near the handle 50. As shown in FIG. 1, the housing's exterior includes the digital display 48 and preferably two buttons 54,56 for operating the device. The first button 54 is a start button, which switches the calculating circuitry on. The circuit preferably includes a timer component that switches off after a predetermined period to preserve battery power. The start button may also be an "off" button, if desired. The reset button 56 resets the counter to "0" for use after the line 14 has been reeled back in (since the counter will count passage of conductive portions in either direction). In its preferred configuration, the buttons 54,56 are positioned to be pressed by the thumb of the hand holding the handle 50 of the rod. Another way to stop the counter and initiate a reading of distance would be to provide a manual control (not shown) that the operator would push to stop the counting and to initiate the distance computation/readout. This would permit the operator to stop the counting when the distant end of the line first hits the water, thereby excluding from the calculation the amount of underwater line travel. The calculator could also measure and display the speed of travel of the line.

The measurement device of the invention would be used by a fisherman as follows: Assuming the line 14 is in its fully reeled-in position, except perhaps for some slack for casting, the start button 54 is pressed to energize the calculating circuitry 20. The fisherman then performs his/her cast, which causes the line 14 to feed out past the sensors 18 on the rod 10. As each conductive portion 16 on the line 14 passes through the sensors 18 and closes the circuit between them, the counter 44 is incremented. Once the cast is finished and the counter is no longer being incremented, the calculator 46 multiplies the count stored in the counter by the preprogrammed distance and the overall distance of the cast is displayed. After reeling in the line 14, the reset button 56 is pressed and the device is ready to measure the next cast.

To measure the depth of a body of water, the start button 54 is pressed and the line 14, with a sufficient weight at the end, is allowed to feed out as the weight sinks. As each conductive portion 16 on the line passes the sensors 18 and closes the circuit, the counter 44 is incremented. Once the weight hits bottom and the counter is no longer incremented, the calculator 46 calculates the depth (i.e., the length of line reeled out) and displays it for the operator.

Thus, a simple, easy-to-use, error-resistant, durable device for measuring distance is provided by the present invention. While the embodiment shown and described is fully capable of achieving the objects of the invention, it is to be understood that this embodiment is shown and described for the purpose of illustration only and not for the purpose of limitation, the invention being limited only by the claims, as follows:

I claim:

1. A distance measuring device for use with a reel mounted on a fishing rod, said measuring device comprising:
   a plurality of electrically conductive portions spaced from one another by a predetermined axial distance along the length of a line adapted to be carried by and unwound from the reel;
   a conductive sensor adapted to be fixedly mounted on the rod along the path of movement of the line, an electrical circuit being completed each time one of said conductive portions of the line passes by said sensor;
   counting means connected to said conductive sensor for counting the number of times the electrical circuit is completed, and calculator means coupled to said counting means for converting the counted number or completed circuits to a proportional distance measurement.

2. The device as in claim 1, wherein said conductive sensor comprises a pair of conductive brushes spaced from one another by a distance less than the axial length of one of said conductive portions.

3. The device as in claim 2, in which said calculator means comprises means for multiplying the output of said counting means by said predetermined axial distance between said conductive portions to determine the length of the line that has passed by said sensor.

4. The device as in claim 3, further comprising: display means coupled to said calculator means for displaying the measured distance based on the output of said calculator means.

5. The device as in claim 4, further comprising
   means coupled to said counting means for resetting said counting means to zero.

6. A distance-measuring device for use with a rod and reel, said device comprising:
   a flexible line adapted to be carried by and unwound from the reel and having a plurality of conductive portions spaced from one another by a predetermined distance along its length;
   sensor means adapted to be fixedly mounted on the rod along the path of movement of said line for producing an output each time one of said conductive portions of said line passes thereby;
   means coupled to said sensor means for calculating the length of said line that has passed by said sensor means based on the number of outputs of said sensor means and said predetermined distance between said conductive portions, and display means coupled to said calculating means for displaying a distance signal based on the output of said calculating means.

7. The device as in claim 6, wherein said sensor means comprises two spaced conductive brushes for mounting on said rod.

* * * * *